Jan. 8, 1952  R. P. HARVEY  2,582,033
KEY HANGER SUPPORT FOR KEY CASES
Filed Oct. 18, 1946  3 Sheets-Sheet 1
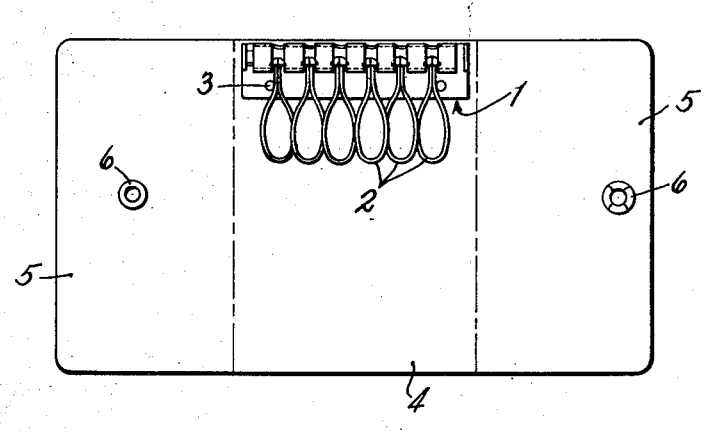
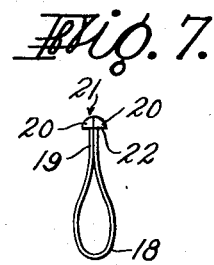
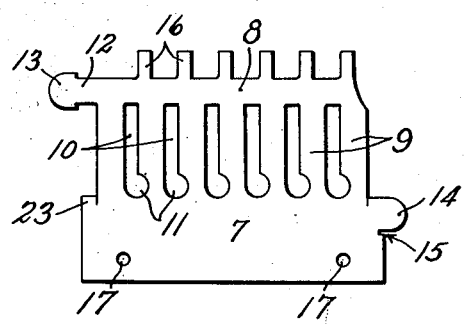
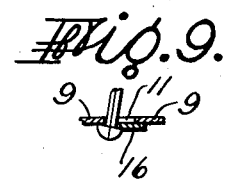
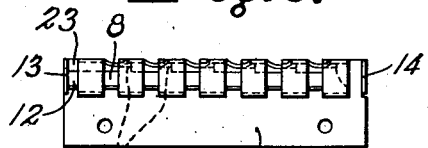
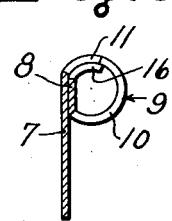
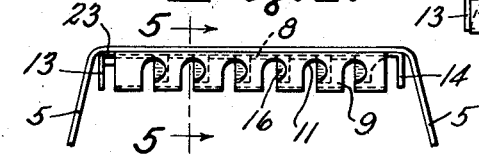
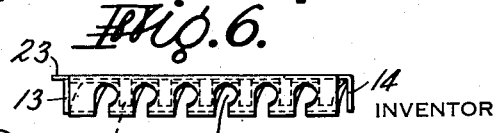
INVENTOR
ROBERT P. HARVEY
BY Chapin + Neal
ATTORNEYS

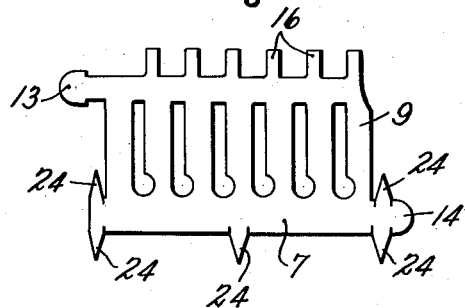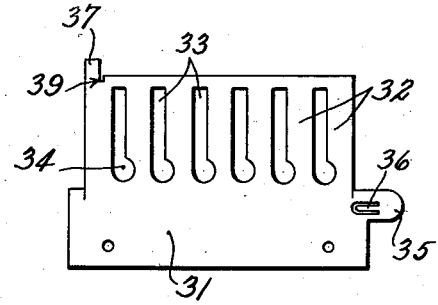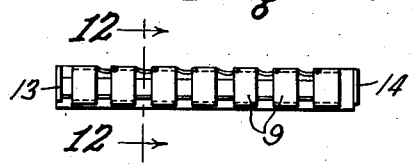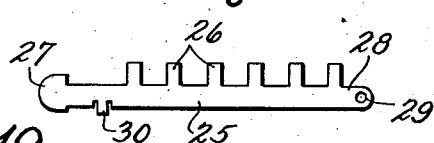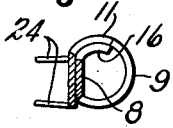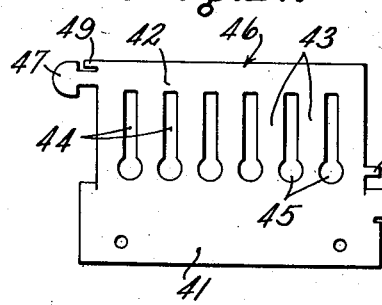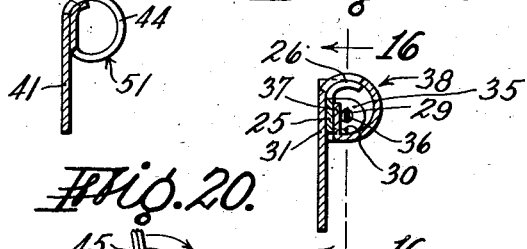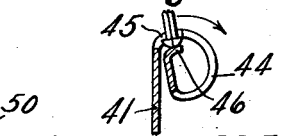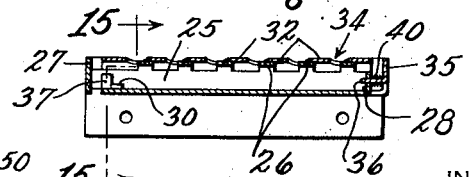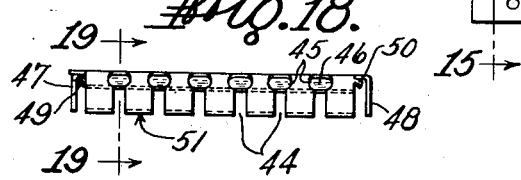

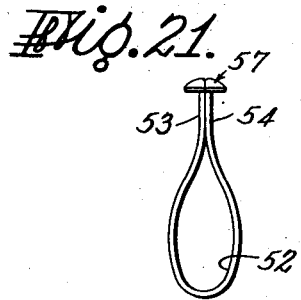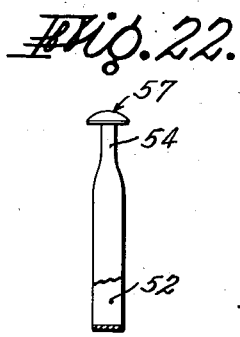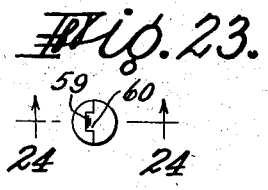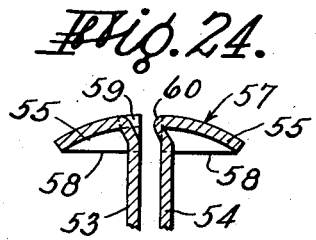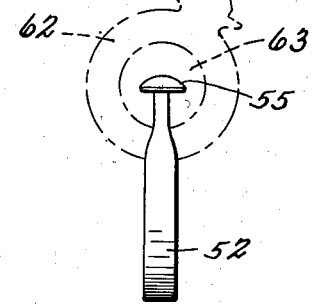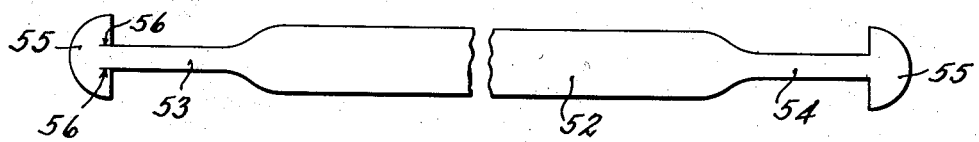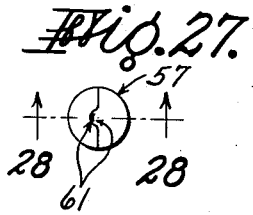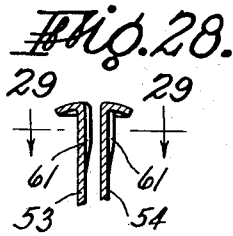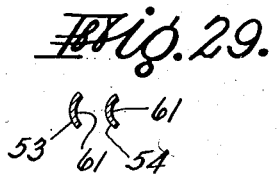

Patented Jan. 8, 1952

2,582,033

UNITED STATES PATENT OFFICE 2,582,033

KEY HANGER SUPPORT FOR KEY CASES

Robert P. Harvey, Longmeadow, Mass., assignor to Buxton, Incorporated, Springfield, Mass., a corporation of Massachusetts Application October 18, 1946, Serial No. 704,249

11 Claims. (Cl. 70—456)

This invention relates to an improvement in key cases and more particularly to the means by which the keys are releasably held in the case.

In key cases of the type to which this invention is directed the keys are each mounted on individual hangers or loops which in turn are releasably connected to a supporting member which is riveted or otherwise secured in the protecting leather case.

One object of the present invention is to provide a supporting structure which can be made as a single piece, the "spring" of the metal itself furnishing resistance to the release of the key hangers.

A further object is to provide a construction by which the hangers can be released in a more facile manner than in prior constructions, whether the supporting structure is made in one piece or two pieces with a separate spring.

A further object is to provide a structure which can be more cheaply manufactured.

A still further object is to provide a novel combination of supporting structure and hanger in which unintentional escape of the hanger is prevented with a minimum spring resistance, permitting greater ease in engaging the hanger in the supporting member.

Other and further objects and advantages will be made apparent from the following specification and claims.

In the accompanying drawings:

Fig. 1 is a front elevational view of an open key case provided with a supporting structure and key hangers in accordance with the invention;

Fig. 2 is a view of a flat blank from which the supporting member of Fig. 1 is formed, but on a larger scale;

Fig. 3 is a front elevational view of the completed supporting member;

Fig. 4 is a top plan view of the supporting member mounted in a case;

Fig. 5 is a section substantially on line 5—5 of Fig. 4 but on a larger scale;

Fig. 6 is a view similar to Fig. 4 but showing the parts moved to releasing position;

Fig. 7 is a view of one of the key hangers of Fig. 1, detached from the support and on a larger scale;

Figs. 8 and 9 are fragmentary views showing one manner of inserting the key holders in the supporting member;

Fig. 10 is a view similar to Fig. 2 but showing a modification;

Fig. 11 is a front elevational view of the finished key support formed from the blank of Fig. 10;

Fig. 12 is a section, on a larger scale, substantially on line 12—12 of Fig. 11;

Fig. 13 shows a blank for forming one element of a two piece supporting member embodying the invention;

Fig. 14 shows a blank for forming the second element of the two piece supporting member;

Fig. 15 is a sectional view on a larger scale of the completed two piece supporting member, substantially on line 15—15 of Fig. 16;

Fig. 16 is a sectional view substantially on line 16—16 of Fig. 15;

Fig. 17 shows a modified form of blank;

Fig. 18 is a top plan view of the supporting member made from the blank of Fig. 17;

Fig. 19 is a sectional view substantially on line 19—19 of Fig. 18;

Fig. 20 is a view similar to Fig. 19 showing one manner of inserting a key hanger;

Fig. 21 is an elevational view of a modified form of key hanger;

Fig. 22 is a view, parts being broken away, looking from the left of Fig. 21;

Fig. 23 is a top plan view of the hanger of Fig. 21;

Fig. 24 is a sectional view, on a greatly enlarged scale, taken substantially on line 24—24 of Fig. 23;

Fig. 25 shows, on a greatly enlarged scale, the blank from which the hanger of Figs. 21 to 24 is formed;

Fig. 26 shows the manner in which a key is placed on the hanger;

Fig. 27 is a top plan view of an alternative form of hanger;

Fig. 28 is a fragmentary sectional view substantially on line 28—28 of Fig. 27; and Fig. 29 is a fragmentary sectional view on line 29—29 of Fig. 28.

Referring to Fig. 1 the key supporting member is generally indicated at 1, to which are attached a plurality of key hangers or loops 2 adapted to carry individual keys. The key supporting member 1 is secured, as by rivets 3, to the center panel 4 of a case formed of flexible leather or the like, having side flaps 5 which may be overlapped over the contents of the case in a usual manner. The case is held closed by snap fastener members 6.

The supporting member 1 of Fig. 1 is formed from a single piece of sheet metal, or other suitable material, shown in blanked out form in Fig. 2. This blank includes a plate member 7 and a bar member 8 integrally connected by spaced members 9 providing elongated slots 10 between them. The ends of the slots adjacent the plate member are enlarged at one side to form escape openings 11. At one end, the left as shown in Fig. 2, the bar member 8 is extended as at 12 and terminates in finger grip forming portion 13. The end of the plate 7, opposite finger grip 13, is formed with a second finger grip forming portion 14, the plate, adjacent portion 14, being preferably notched as at 15 to a depth equal to the thickness of the metal.

Extending from the upper edge of bar 8 are a plurality of fingers 16, equal in number to the escape openings 11 and aligned therewith.

Plate member 7 is formed with openings 17 for receiving the rivets 3 by which the plate is secured to the case.

In forming the support the upper portion of the blank is rolled downwardly as shown in Fig. 5, the spaced members 9 forming a tube or cylinder, around which slots 10 extend, with the bar member 8 lying against the upper portion of plate member 7. The fingers 16 then extend across the escape openings 11 as best shown in Figs. 4 and 5.

The finger pieces 13 and 14 are bent outwardly at right angles to the bar 8 and plate 7 respectively, as best shown in Figs. 3 and 4.

As will be apparent the bar member 8 and the fingers 16 are supported and held in position by the relatively narrow spaced members 9. The metal from which the blank is made is of a character or quality to have sufficient spring action so that, while normally holding the fingers in position to cover the escape opening, the members 9 will yield laterally enough to move the bar and its fingers axially of the tube to a release position in which the escape openings 11 are uncovered.

The arrangement of the finger grips 13 and 14 provide an efficient means by which pressure may be applied to move the bar and fingers to release position, as shown in Fig. 6. It is only necessary considering a right handed user, to place the thumb for example against the grip 13 and the forefinger against grip 14 and pinch the grips to exert a substantial pressure tending to move the bar grip 13 toward the stationary plate grip 14. The force thus made available is ample to move the bar to release position against a substantial spring resistance in the metal.

The key hangers or loops 2 may take various forms. As shown in Figs. 1, 7, 8 and 9 the loops are made from a piece of spring wire bent to form a key receiving loop portion 18, the end portions being brought together to form a shank portion 19. The free ends of the shank forming portions are provided, by swaging or other means, with enlarged head members 20 which together form an enlarged head 21 of generally hemispherical shape with its flat face 22 adjacent the shank.

The shank 19 is of cross-sectional size to slide freely in the slots 10 while the head 21 is of a size to pass freely inwardly and outwardly through the openings 11, when the latter are uncovered by transverse movement of the fingers 16, but not through the slots 10.

As shown diagrammatically in Fig. 8 the loops may be inserted in the supporting member without recourse to the finger grips. By inserting the head edgewise into the slot with the rounded surface of the head against the edge of the adjacent member 9 and the shank against the edge of the finger 16, the rounded head acts as a cam or wedge, when the loop is swung in the direction of the arrow, forcing the adjacent finger back to admit the head through the opening 11. Removal of the hanger requires operation by the finger grips since the flat underside of the head presents no cam surface for wedging the adjacent finger to one side.

The shape of the hanger head described has the further advantage that in use, as the hanger is moved back and forth in its slot the flat underside of the head distributes the strain and wear over a substantial area rather than concentrating it on the edges of the slot as in the case of a round head. The metal of the supporting member may therefor be made relatively thin without danger of the head wearing its way through, permitting a greater degree of springiness in the members 9.

Preferably the plate member 7 is extended as at 23 a distance at least equal to the degree of endwise extension of portion 12 and grip 13 when the latter is bent forwardly. Thus as shown in Fig. 4, the side portions 5 of the cover, when folded over, first engage the rigid edge of extension 23 and the rigid finger grip 14, minimizing the possibility of the accidental shifting of bar 8 by pull on the cover portions 5. However, as will be apparent, the bar can be intentionally operated even when the cover is closed by pinching the grips through the flexible cover, in the manner previously described, to release a key and its hanger when extending in operative position from the end of a closed case.

The modified form supporting member shown in Figs. 10, 11 and 12 is wholly similar to that previously described except that the lower portions of plate 7 which carries the rivet holes is cut away. In this form the plate 7 is provided with fastening prongs 24 which when bent rearwardly as shown in Fig. 12 may be inserted through the case and bent over to secure the supporting member to the case. This form as is apparent from Fig. 11 presents a minimum of exposed metal and gives a light and neat appearance. It also reduces cost since less metal and no conventional rivets are required.

In Figs. 13 to 16 inclusive is shown a modified form in which the bar 8 is made as a separate piece 25 from the plate. The bar 25 carries closure fingers 26 similar to fingers 16 and finger grip 27 corresponding to grip 13 previously described. In addition bar 25 is provided with an endwise ear extension 28 formed with an opening 29. The lower edge of the bar is provided with short tongue 30. The plate member 31 corresponds substantially to plate 7 previously described including relatively narrow members 32, forming slots 33 with escape openings 34 and a finger grip 35 entirely similar to members 9, slots 10, openings 11 and grip 14 of the previous forms. In addition finger grip 35 is formed with a tongue 36, and the upper edge of the blank is formed with a tongue 37.

In assembling the support the tongue 37 is bent forwardly at right angles and the upper portion of the blank rolled downwardly into tubular form 38 as shown in Fig. 15.

Grip 27, extension 28 and tongue 30 of bar 25 are bent forwardly at right angles to the bar, and the bar positioned inside of the tube 38 between plate 31 and tongue 37, the latter being cut back sufficiently as at 39 to accommodate the thickness of the bar. Tongue 36 is cut back from the line on which finger grip 35 is bent with respect to plate 31 so that when bent at right angles to finger grip 35, the tongue is spaced from the plate (Figs. 15 and 16) in position to enter opening 29. A compression spring 40 is telescoped on tongue 36 between grip 35 and the bent up portion 28 of bar 25. Spring 40 normally maintains tongue 30 against tongue 37, the latter acting as a stop to hold the bar in a position in which fingers 26 cover the openings 11. Pinching grips 27 and 35 together moves the bar 25 to the right as viewed in Fig. 16 against the action of the spring to shift fingers 26 so as to uncover the escape openings 34 permitting insertion or removal of the key hangers from the support. Key hangers may be inserted without recourse to grips 27 and 35 in the manner previously described.

In the forms so far described the release openings are shown offset at the ends of the slots. They may, however, be otherwise positioned if desired. The offset arrangement has the advantage that it minimizes the extent of longitudinal movement of the bar necessary to uncover the escape openings where uncovering of the openings is dependent entirely on such longitudinal movement. It also has the advantage that the closure, when in closed position, does not shorten the effective length of the slots.

The centering of the escape openings with respect to the slots is in some cases desirable since the holder has a more symmetrical appearance. While this can be done, as above pointed out, in the forms so far described by increasing the endwise travel of the bar, there is shown in Figs. 17 to 20 inclusive, a modified arrangement of one piece construction in which the escape openings are centered with respect to the slots but without substantial, if any, increase in the extent of endwise travel of the bar for release of the key holders.

Fig. 17 shows the blank from which this modified form is made. It is generally similar to the blank shown in Fig. 2 except in the following features. It comprises a plate member 41 and a bar member 42 connected to the plate by spaced members 43 forming slots 44. Escape openings 45 are formed at one end of each slot, these openings being symmetrical with respect to the slots. In place of the separate closure fingers 16, carried by the bar of the first and second forms described, bar 42 is extended slightly as at 46. Finger grips 47 and 48, similar in arrangement and function to the grips of the previous forms, extend respectively from the left hand end of bar 42 and the right hand end of plate 41. At the end of the extending portion 46, adjacent grip 47, a short cam tongue 49 is formed and a similar cam tongue 50 extends adjacent grip 48. The upper portion of the blank is rolled downwardly to form a tube generally indicated at 51 to position portion 46 of the bar across the entrance to slots 45 and normally bar entrance of the hangers into or through the escape openings 45, as shown in Figs. 18 and 19. The cam tongue 49 carried by bar 46 extends beyond the end of the tube and is bent outwardly as shown in Fig. 18 while cam tongue 50, carried by the plate and which also extends beyond the end of the tube, is bent inwardly. Grips 47 and 48 are bent into the position as shown in Fig. 18. When grip 47 is pinched toward grip 48 the bar 42 is moved endwise against the "spring" of the metal in members 43. At the inception of such movement or immediately thereafter cam 49 engages the adjacent edge of the tube while cam 50 is engaged by the adjacent end of the bar, and the effect of continued endwise movement is to cam the bar inwardly of the tube and away from openings 45 permitting entrance or removal of the heads of the key hangers as shown in Fig. 20. As will be apparent from the latter figure the hanger heads may be forced inwardly through the openings 45 without recourse to operation of the finger grips. By combining a component of generally radially inward movement with the endwise movement of the bar, the symmetrically positioned openings 45 are unblocked without excessive endwise movement.

In all of the one piece forms described the "spring" of the metal from which the support is made is utilized to resist movement of the closure to open position and to return it to closing position after it has been shifted. Given sufficiently stiff spring action round headed hangers such as are common in the prior art may satisfactorily be used with any of the described forms of this invention. However, as previously pointed out, a hanger having a rounded or curved top surface and a lower or under support contacting surface which lies in a plane, provides increased security and when combined with the other features of the invention permits the use of less spring resistance than is needed when a round headed hanger is used.

In all of the forms described the finger grips are spaced from the ends of the tube a distance substantially equal to the endwise movement of the bar, the grip carried by the plate acting as a stop to limit movement of the bar in that direction.

All of the forms permit release of the hangers by pinching one grip toward the other and pinching may be effected when the case is closed, thus a key extending from the case may be easily released while engaged in the lock of a door or the ignition switch of an automobile.

As shown in Fig. 5 the under contacting surface of the head is continuous. Continuity of the undersurface, however, is not necessary and the advantages of the invention can be secured by an annular contacting surface so long as the intervening portions bridge the slot. Since the areas or points of contact of the head with the interior of the tubular support are carried beyond the edges of the slots wear of both the head of the hanger and the edges of the slots is reduced. This in addition to permitting thinner metal to be used for the support permits a lighter and less expensive hanger construction. As shown in Figs. 21 to 29 inclusive a satisfactory hanger may be blanked and shaped from a length of metal ribbon. Fig. 25 shows a suitably shaped blank, the size being greatly exaggerated for clearness. The blank of Fig. 25 comprises a loop forming portion 52 which is the full width of the ribbon, narrowed shank forming portions 53—54 and substantially semi-circular head forming portions 55. One of the shank portions as 53 is cut slightly into the head as indicated at 56. The portion 52 is bent into a wide loop with the shank portions 53—54 brought into contact as shown in Fig. 21. Prior to or after the formation of the loop, the head forming portions 55 are shaped by one or more stamping or pressing operations into the form shown in Fig. 24 where the loop ends are shown separated to better show the construction. As there shown each of the substantially semi-circular head portions 55 are cupped downwardly to form an upper curved surface 57 with the curved edges 58 of the members 55 lying in a common plane. The cuts 56 form a recess 59 in one head member where the shank member 53 joins the head into which the projection 60 engages, projection 60 being formed by the bend of shank member 54 where the latter joins its head member. Normally the opposite shank and head members are held in contact by the spring of the metal in the loop as shown in Figs. 21 and 27, the engagement of projection 60 in recess 59 preventing sidewise slippage of the shank members. Sidewise slippage of the shank members may alternatively be prevented by pressing or stamping the shank members into an interengaging curved cross-sectional form as shown at 61 in Figs. 27, 28 and 29.

In any of the hanger forms described the key is placed in the loop by forcing the key head 62 edgewise between the shanks of the loop and position the head members 55 on opposite sides of the opening 63 in the key head, shown in dotted lines in Fig. 26. The key head is then rocked to thread it over one of the shanks and into the loop. This operation has required a substantial amount of force in prior hangers of this type because the metal wire used had to be relatively heavy and stiff to withstand the abrasive and resulting distorting strains incident to the travel of a ball-head along the hanger retaining slots. By the present invention these difficulties are minimized by the use of a planar working surface at the underside of the head so that lighter material with an easier spring action may be used and less force is required to engage a key in the loop.

While the headed hanger having a generally planar support engaging surface has a particular advantage with respect to the novel support of the present invention in that it prevents removal of the hanger by a camming action against the spring actuated release, it has the general advantage that it minimizes wear tending to widen the slots in any key support of the slotted type.

It will be understood that, while several forms of supports and hangers embodying the invention have been shown, that the invention is not limited to such preferred forms and the scope of the invention is defined by the appended claims rather than by the foregoing description.

What I claim is:

1. A key hanger support which comprises a rigid plate, a tubular member extending from one longitudinal edge of the plate and overlying at least a portion of the plate, said tubular member being formed with a plurality of slots, each of said slots having an enlarged escape opening, a bar positioned inside of the tubular member and having a spring connection with the plate, portions of said bar normally blocking said escape openings, a portion of the bar extending outwardly of one end of the tube, said bar being movable within the tube in the direction of the other end thereof against the resistance of said spring connection to unblock the escape openings, a finger grip carried by the bar outwardly of the end of the tube, a second finger grip carried by the plate at the opposite end of the tube, each of said grips being spaced from the end of the tube a distance substantially equal to the extent of endwise movement of the bar.

2. A one piece key hanger support which comprises a rigid plate member, a bar member and spaced slot-forming members integrally connecting said plate and bar member and forming a spring connection between the two, the space between said slot forming members being increased at one point to form an escape opening, said slot-forming members being bent to form a generally tubular member and position the bar inside of the tube with a portion of the bar member blocking said escape openings and held in blocking position by the spring of the slot-forming members, a portion of the bar extending outwardly of the tube, said extending portion forming means for the application of force to the bar to move the latter endwise against the spring resistance of the spaced slot forming members and unblock the escape opening.

3. A one piece key hanger support which comprises a rigid plate member, a bar member and spaced slot-forming members integrally connecting the plate and bar members and forming a spring connection between the two, the spacing of said slot-forming members being increased at one point to form an escape opening, said slot forming members being bent to form a generally tubular member and position the bar member inside of the tube with a portion of the bar member blocking said escape opening and held in blocking position by the spring of the slot forming members, a portion of the plate member extending outwardly beyond one end of the tube and bent to form a finger grip spaced from the adjacent end of the bar member, the opposite end of the bar member having a portion extending endwise from the tube and bent to form a second finger grip spaced from the adjacent end of the tube.

4. A one piece key hanger support which comprises a rigid plate member, a bar member and spaced slot-forming members integrally connecting the plate and bar members and forming a spring connection between the two, the spacing of said slot-forming members being increased at one point to form an escape opening, said slot forming members being bent to form a generally tubular member and position the bar member inside of the tube with a portion of the bar member blocking said escape opening and held in blocking position by the spring of the slot forming members, a portion of the plate member extending outwardly beyond one end of the tube and bent to form a finger grip spaced from the adjacent end of the bar member, the opposite end of the bar member having a portion extending endwise from the tube and bent to form a second finger grip spaced from the adjacent end of the tube, a cam finger carried by the end of the tube adjacent the first finger grip and bent inwardly to form an inclined cam face, a second cam finger carried by the bar adjacent the second finger grip and bent outwardly to form an inclined cam face, said cam faces being respectively engageable by the adjacent end of the bar and the adjacent end of the tube, when the bar is moved longitudinally of the tube by pinching pressure applied to the finger grips.

5. A key hanger comprising a strip of metal having the portions intermediate its end portions bent into the form of a key supporting loop, the portions adjacent its ends being brought together to form a shank, the extreme end portions being shaped to form a head having a generally convex top surface, the under surface adjacent to and presented toward the shank being generally concave, the shank forming portion adjacent the head being bent to provide interengaging portions.

6. A key hanger comprising a flat strip of metal having the portions intermediate its end portions bent into the form of a key supporting loop, the portions adjacent its ends being brought together to form a shank, the extreme end portions being bent outwardly and shaped to form an enlarged head having a generally convex top surface, the under surface adjacent to and presented toward the shank being generally concave, the shank forming portions being transversely bent adjacent the head to provide interengaging portions.

7. A key hanger comprising a flat strip of metal having the portions intermediate its end portions bent into the form of a key supporting loop, the portions adjacent its ends being brought together to form a shank, the extreme end portions being bent outwardly and shaped to form an enlarged head having a generally convex top surface, the under surface adjacent to and presented toward the shank being generally concave, the shank forming portions being longitudinally bent to provide interengaging portions.

8. A key hanger support which comprises a rigid plate, a tubular member extending from one longitudinal edge of the plate, said tubular member being provided with a plurality of slots, each of said slots having an enlarged escape opening, a bar positioned inside of the tubular member for movement longitudinally of the tube and having a spring connection with the plate, portions of said bar normally blocking said escape opening, said blocking portions presenting an edge toward the center of the escape opening engageable by a key hanger to move the bar within the tube against the resistance of said spring connection and admit the hanger into the adjacent slot.

9. A key hanger support which comprises a plate member, a generally tubular member extending from one longitudinal edge thereof, said tubular member overlying at least a portion of said plate member and being provided with a transverse slot, said slot being enlarged at one point, a bar member positioned within said tubular member and having one end extending outwardly thereof, said end being provided with a finger grip, said bar member being movable from a position in which said grip is spaced from the adjacent end of the tubular member to a position in which said grip contacts said end of the tubular member, said bar member being resiliently connected to said plate to be normally held in said first position, said bar member having a portion which closes said enlarged portion of the slot when the bar member is in said first position and opens said enlarged portion of the slot when the bar is in said second position, and a second finger grip extending from said plate member adjacent the opposite end of the tube from the first-mentioned finger grip.

10. A key hanger support which comprises a plate member including a tubular portion provided with a transverse slot, said slot being enlarged at one point to form an escape opening, a bar member slidably positioned within said tubular member and having a spring connection with the plate, said spring connection normally maintaining one portion of the bar outwardly of the tubular member and another portion of said bar in a position blocking said escape opening, coaxially arranged finger engaging surfaces positioned at opposite ends of the tubular member one being rigid with respect to the tubular member and the other carried by and movable with said bar, whereby a pinching action applied to said finger engaging surfaces will move the outwardly extending portion of said bar inwardly of the tube and said blocking portion of the bar free of the escape opening, against the action of said spring connection.

11. A key hanger as defined in claim 10 in which the said rigid finger engaging surface is carried by a gripping member extending from the plate member and having a tongue extending therefrom inwardly of said tubular portion, an ear extending at right angles from the adjacent end of the bar, said ear being formed with an opening within which the free end portion of said tongue engages, and a coiled spring supported on the tongue between said ear and said gripping member and forming the spring connection between said bar and said plate.

ROBERT P. HARVEY.

REFERENCES CITED

The following references are of record in the file of this patent:

UNITED STATES PATENTS

| Number | Name | Date |
| --- | --- | --- |
| 1,598,207 | Lorber | Aug. 31, 1926 |
| 1,908,846 | Howe | May 16, 1933 |
| 2,038,070 | Welch | Apr. 21, 1936 |
| 2,093,326 | Legat | Sept. 14, 1937 |
| 2,114,172 | Boden | Apr. 12, 1938 |
| 2,201,833 | Koelling | May 21, 1940 |
| 2,201,850 | Dawson, Jr | May 21, 1940 |
| 2,342,078 | Jones | Feb. 15, 1944 |
| 2,348,947 | Zarowin | May 16, 1944 |
| 2,351,205 | Harvey | June 13, 1944 |
| 2,401,753 | Geller | June 11, 1946 |
| 2,407,153 | Hanna | Sept. 3, 1946 |